United States Patent [19]
Bermon et al.

[11] Patent Number: 5,946,212
[45] Date of Patent: Aug. 31, 1999

[54] METHOD OF ALLOCATING WORK IN CAPACITY PLANNING

[75] Inventors: Stuart Bermon, Mt. Kisco; Gerald E. Feigin, Scarborough, both of N.Y.

[73] Assignee: International Business Machines Corporation, Armonk, N.Y.

[21] Appl. No.: 08/901,300

[22] Filed: Jul. 28, 1997

[51] Int. Cl.[6] .................................................. G06F 19/00
[52] U.S. Cl. ..................... 364/468.03; 364/149; 29/832
[58] Field of Search ............................. 364/468, 468.05, 364/149, 402; 29/832

[56] References Cited

U.S. PATENT DOCUMENTS

| | | | |
|---|---|---|---|
| 5,086,397 | 2/1992 | Schuster et al. | 364/468 |
| 5,280,425 | 1/1994 | Hogge | 364/402 |
| 5,710,700 | 1/1998 | Kurtzberg et al. | 364/149 |
| 5,748,478 | 5/1998 | Pan et al. | 364/468.05 |

Primary Examiner—William Grant
Assistant Examiner—Victoria Robinson
Attorney, Agent, or Firm—Whitham, Curtis & Whitham; Steven C. Kaufman

[57] ABSTRACT

A computer implemented method provides accurate capacity planning for manufacturing environments comprising parallel, unrelated tools that can process the same operations at different rates and with preferences for the sequence in which those tools are selected to accommodate the workload. The method reliably determines precisely what are the gating tools among sets of parallel, unrelated tools in a complex manufacturing environment in which different tools can perform the same or similar sets of operations, generally at different rates. The primary, secondary, etc. tool groups in each cascade set are explicitly kept track of in order to enable the correct penalty function to be associated with the appropriate tool group. The end user may also interact with the input data through a Menu Program or through a Graphical User Interface (GUI) and modify the data for "what-if" analyses.

9 Claims, 6 Drawing Sheets

FIG.5C ial investment ($1B for semiconductor
METHOD OF ALLOCATING WORK IN CAPACITY PLANNING

BACKGROUND OF THE INVENTION

1. Field of the Invention

The present invention generally relates to a method for allocating work in capacity planning and, more particularly, to a method for accurate capacity planning which deals with parallel, unrelated tools that can process the same operations at different rates and with the preferences for the sequence in which those tools are selected to accommodate the workload.

2. Background Description

The capacity of a manufacturing line is characterized by the tool set that occupies the line. This tool set may represent a large capital investment ($1B for semiconductor fabrication) and depreciation burden. It typically consists of multiple generations of tools giving rise to a mix of different equipment with different yields, availabilities and speeds for completing particular operations. Also, engineers typically have an understanding of which tools are best suited to perform a particular operation, which tools are next best, and so on. The best tool may be the fastest or highest yielding. The second best may be an older, slower, less reliable tool. Depending on the manufacturing environment and life cycles of the products and tools, there may be as many as five or more different tools that can perform a given process step, each with its own distinct operating characteristics.

Broadly speaking, manufacturing capacity planning addresses three kinds of problems:

(1) deciding the number of tools necessary to produce a particular product mix and volume;

(2) deciding what is the "optimal" product mix and volume to maximize the value of an existing tool set; and (3) deciding on what additional tools to acquire to add to an existing tool set.

In a simple manufacturing environment, addressing all three questions is relatively straightforward. For example, for the case of calculating the required number of tools when operations are not shared among tools, one can simply divide the time required per day to perform all the operations done by a certain type of tool by the time available per day for this type of tool to arrive at an estimate of the number of required tools. However, in the more complex manufacturing environments in which different tools can perform the same or similar sets of operations, generally at different rates, these decisions become much more difficult because of the different ways in which work can be allocated among different tools. The necessity of respecting the preferred order in which the machines are assigned work further increases the level of the complexity of the problem.

Typically, capacity planning problems are addressed by making use of some type of mathematical model of the manufacturing process. The model may take the form of a simple spreadsheet, a detailed discrete event simulation, or a mathematical program such as a linear or mixed integer program. W. J. Hopp and M. L. Spearman, *Factory Physics: Foundations of Manufacturing Management*, Irwin (1996), and E. A. Silver and R. Peterson, *Decision Systems for Inventory Management and Production Planning*, 2$^{nd}$ Ed., John Wiley & Sons (1985), provide simple examples of conventional capacity planning problems and how to analyze them. W. Chou and J. Everton, "Capacity Planning for Development Wafer Fab Expansion", *Proc. of the* 1997 7$^{th}$ *Annual IEEE/SEMI Advanced Semiconductor Manufacturing Converence*, pp. 17–22 (1996), describe the use of a discrete event simulation model in capacity planning. K. M. Bretthauer and M. J. Cote, "Nonlinear Programming for Multiperiod Capacity Planning in a Manufacturing System", *European Journal of Operational Research*, 96:1, pp. 167–179 (1997), and R. G. Kasilingam and C. Roze, "Formulations of the Capacity Planning Problem Considering Manufacturing Flexibility", *International Journal of Systems Science*, 27:10, pp. 1027–1031 (1996), describe mathematical programming models for capacity planning. L. M. Wein, "Capacity Allocation in Generalized Jackson Networks", *Operations Research Letters*, Vol. 8. pp. 143–146 (1980), describes a method for capacity planning based on a queuing network model that assumes, among other things, that all tools capable of performing a given operation are identical. R. C. Leachman and T. F. Carmon, "On Capacity Modeling for Production Planning with Alternative Machine Types", *IIE Transactions*, 24:4, pp. 62–72 (1992), discuss capacity modeling with alternate machine types, but limit their discussion to the case that processing times among such alternate machine types are identical or proportional across operations they can perform. None of the above addresses capacity planning problems in which work can be allocated to different tools, with varying ratios of process times from operation to operation and in which there exists a preferred order in which tools are used.

SUMMARY OF THE INVENTION

It is therefore an object of the invention to provide a method for accurate capacity planning which deals with parallel, unrelated tools that can process the same operations at different rates and with the preferences for the sequence in which those tools are selected to accommodate the workload.

It is another object of the invention to provide a method for the reliable determination of precisely what are the gating tools among sets of parallel, unrelated tools in a complex manufacturing environment in which different tools can perform the same or similar sets of operations, generally at different rates.

According to the invention, there is provided a method implemented on a computation engine that aggregates very raw data detailing by time period, the processing times, tool availabilities, load factors, and the number of passes per product for every operation on every tool group in the manufacturing line into the required inputs. The computation engine scans the list of operations, locating identical operation names within cascade sets of tool groups and organizes tool groups and the operations into the appropriate cascade groups. The primary, secondary, etc. tool groups in each cascade set are explicitly kept track of in order to enable the correct penalty function to be associated with the appropriate tool group. The end user may also interact with the input data through a Menu Program or through a Graphical User Interface (GUI) and modify the data (for example, changing the allowed ranges for product starts, the profits associated with each product and/or the numbers of tools per tool group) for "what-if" analyses.

The method according to the invention for allocating work in rank order across parallel unrelated tools for capacity planning is formulated as a non-integer, linear program with piecewise-linear penalty terms incorporated into the objective function which serve to discourage, but not prevent, using a tool group to greater than 100% of its available time and to distribute work in the preferred sequence among such parallel, unrelated tool groups. In this way, the implementation is able to provide output data on both the number of tools needed for a particular product mix and volumes and on the optimal product mix and volumes for a fixed tool set. Output data is contained in formatted output reports by individual time period and in multi-period summary reports which detail required versus available numbers of tools and/or the derived optimum number of starts per day by product.

The results of the various "what-if" scenarios are organized into sets of files whose filenames end in a characteristic suffix, a trial name, initially selectable by the user and which he can use to retrieve such files by selection through the GUI or Menu. If desired, detailed output reports can be printed breaking down tool group usage by operation, such information frequently being of vital interest to engineers with responsibility for particular cascade sets.

The implementation also includes a module, that using the capability described in the invention of being able to identify truly gating tool groups among parallel, unrelated tool groups, selects those tool groups for incrementing, producing a new optimal solution for product mix and volume that represents the most efficient way of increasing manufacturing line output for the least number of additional tools. Any number of automatic iterations of the tool set can be set by the user.

BRIEF DESCRIPTION OF THE DRAWINGS

The foregoing and other objects, aspects and advantages will be better understood from the following detailed description of a preferred embodiment of the invention with reference to the drawing in which.

DETAILED DESCRIPTION OF A PREFERRED EMBODIMENT OF THE INVENTION

The solution to capacity planning problems in which work can be allocated to different tools, with varying ratios of process times from operation to operation and in which there exists a preferred order in which tools are used according to the present invention assumes that all tools in a factory can be grouped into distinct tool groups. A tool group consists of a set of one or more identical tools. By identical, what is meant is that each tool in a tool group is qualified to perform the same set of operations at the same speed with the same reliability. From the perspective of capacity planning, tools are viewed as belonging to a given tool group as indistinguishable. As a result, a tool group containing N tools has N times the capacity of a single tool contained in the tool group. Tools in different tool groups may be able to perform the same or similar sets of operations, possibly at different speeds. Tools from different tool groups that can perform at least one operation in common are referred to as parallel and unrelated; parallel because they can all be used to perform the common operations and unrelated because they perform operations at different speeds and with different reliability. Among such sets of parallel unrelated tool groups, there will exist a tool group of first choice to which work is initially directed and which is referred to as the primary tool group. If that tool group is occupied, work is then directed to the next tool group of choice, referred to as the secondary tool group. In turn, if the secondary tool group is not available, work flows to the third tool group in line, referred to as the tertiary tool group. The fourth and fifth ranked tool groups in a set are the quaternary and quintinary tool groups, respectively. Tool groups with operations in common are referred to as cascade sets, the term cascade reflecting the above described behavior in which work cascades down from the primary to successively lower ranked tool groups. Those that do not share work with other tool groups are called non-cascade tool groups.

Figure 1A:
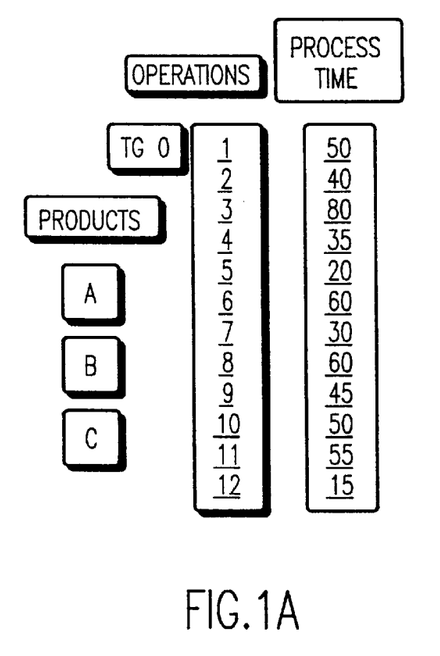
FIGS. 1A and 1B are respectively block diagrams illustrating examples of a non-cascade tool group and a cascade set consisting of several cascade tool groups.
Figure 1B:
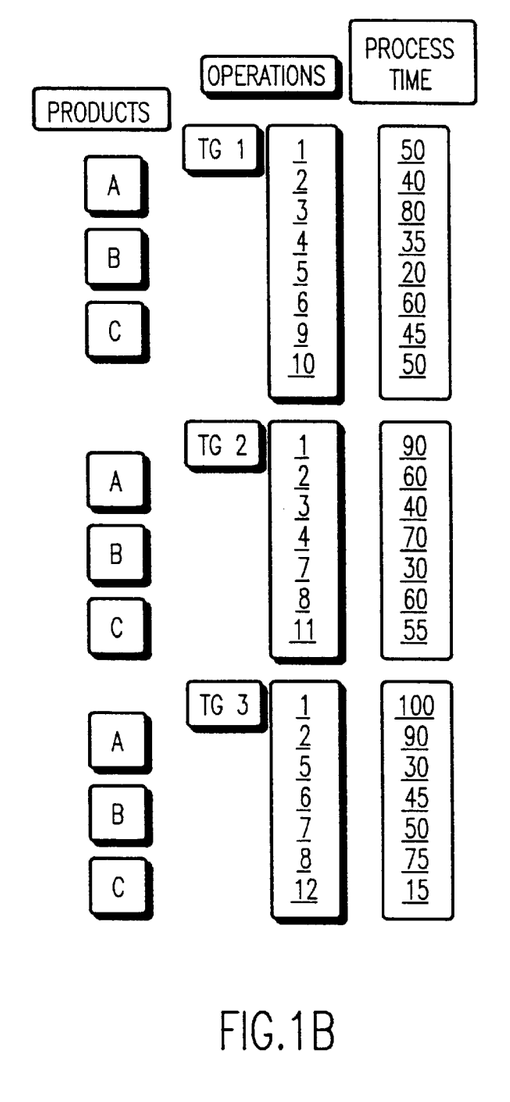

Referring now to the drawings, and more particularly to FIGS. 1A and 1B, there is shown a simple example illustrating the difference between a non-cascade tool group and a set of cascaded tool groups. In this example, three different products labeled A, B and C are required to be processed through the twelve operations labeled 1 through 12. In FIG. 1A, the case illustrated is one in which all twelve operations are performed by one non-cascade tool group, TG0. In this case, the capacity planning problem reduces to the relatively simple problem of figuring out the number of tools in this tool group needed to process a specified number of products A, B and C per unit of time. For example, suppose we would like to be able to produce ten parts of product A per day, twenty of B and fifteen of C. Since each part requires fifty-four minutes of processing (the sum of the processing time for operations 1 through 12), the total required processing time is 54×10+54×20+54×15=2430 minutes or 40.5 hours. Suppose each tool is available for fifteen hours per day. Then a minimum of three (40.5/15≈2.7 rounded up to the nearest integer) tools is required to produce the required number of products.

The situation depicted in FIG. 1B, on the other hand, is more complex. In this case, there are three tool groups belonging to a cascade set, each of which can perform a subset of all the operations. Tool group TG1 is designated as the primary tool group, tool group TG2 is the secondary tool group, and tool group TG3 is the tertiary tool group. Some operations are shared among all three tool groups, some between two and some are confined to only one tool group. The ratio of the sample process times for tool groups performing the same operation varies over a wide range. The simple analysis that works for the case illustrated in FIG. 1A does not apply to the case illustrated in FIG. 1B because work is capable of flowing back and forth among all three tool groups. A more general approach must be formulated that takes into account both the sharing of work among tool groups (with different process rates) as well as the indicated order preference for allocating work among the various tool groups.

The third broad problem addressed by capacity planning analysis is deciding on what additional tools to acquire to add to an existing tool set. For such purpose, it is essential to determine what tool groups constitute gating or pinchpoint tool groups; i.e., those tool groups, as the terms imply, that limit the production of the line. Gating non-cascade tool groups are simply those tool groups that are operating at 100% of capacity. For unrelated, parallel tool groups that can partially share work namely those of a cascade set, the situation is much more complicated. Cascade tool groups may be at the 100% level, but not be gating because additional workload can be freely allocated to other members of the cascade set. On the other hand, such tool groups may be truly gating because the other cascade tool groups are not able to handle any additional work. It is not possible to distinguish gating from non-gating cascade tool groups merely by noting their fractional use. A method is needed that can simply and reliably identify the unrelated, parallel tool groups that are truly gating.

The present invention is a method for calculating the allocation of the workload to parallel, unrelated tool groups (tool groups in a cascade set), with a preference for the order in which the tool groups are to be used and in which the ratios of the process times of operations performed on different tool groups varies by operation. The method of the invention also identifies which tool groups of a cascade set are gating. The required input data describes the tool group parameters and the workload for each product. The calculated output consists either of the number of tools required per tool group to produce a particular product mix and volume, or of the optimal product mix and volume for a particular fixed tool set. Gating tool groups are explicitly indicated. The output is delivered directly to the end user or as an input to other decision support systems.

The allocation of the workload is calculated using mathematical programming, in which equations are defined for each process step and the unique set of tool groups capable of performing that process step are written and the time required to process multiple products through that operation is related to the time available on this set of tool groups and to the fractional uses of each of the tool groups. These equations effectively constrain the optimal solution through the use of penalty terms in the objective function associated with each tool group, which represent the preferred order for using the parallel unrelated tool groups in each cascade set.

Single Operation

Shown in Equation (1) below is the defining equation described in the previous paragraph for the simplest case, consisting of a set of parallel unrelated tool groups (denoted by T) capable of performing a single operation (denoted by s) on multiple products (denoted by P):

$$\sum_{p \in P} W_p U_{p,s} = \sum_{t \in T} f_{s,t} \frac{N_t A_t}{R_{s,t}} \quad (1)$$

Here $W_p$ is the number of parts per day of product p being processed through operation s, while $U_{p,s}$, called Usage, is the time required to process one unit of product p through s (including all passes of that product through s) on the primary or preferred tool group among the set of parallel unrelated tool groups capable of performing the operation. $N_t$ and $A_t$ are the number of tools in the tool group t and the available time per day for each such tool group respectively, while $R_{s,t}$ is the ratio of the processing time of tool group t to that of the primary or preferred tool group. Lastly, $f_{s,t}$ is the fractional allocation of the work coming to operation s to tool group t.

The left side of Equation (1) represents the total required time referenced to the primary tool group for all products being processed through operation s, while the right side of the equation represents how that time will be allocated to each of the tool groups capable of performing that operation, with an effective available time per day for each tool group introduced in order to take into account the fact that the processing time on the various tool groups relative to the primary tool group is the variable ratio $R_{s,t}$.

Possible decision variables are $W_p$, $N_t$ and of course $f_{s,t}$. Fixing the number of tools converts this into a linear equation, enabling the use of linear programming techniques to obtain a solution.

A suitable objective function for the mathematical program (linear or non-linear) might take the form $$\text{Maximize} \sum_{p \in P} W_p P_p - \sum_i H_i(f_{s,t}) \quad (2)$$

where $P_p$ might represent the profit or revenue produced by one part per day of product P. The first term thus represents the primary goal of maximizing total profit or revenue while the second provides for the allocation of work to tool groups in proper sequence. $H_i(f_{s,t})$ are penalty functions associated with the variously ranked members in the set of parallel unrelated tool groups. $H_1$ is the penalty function for the primary tool group, that to which work is to be channeled first, while $H_2$ is that for the secondary tool group and $H_3$ that for the tertiary tool group and so on for the quaternary and quintenary, etc. tool groups of the cascade set. The penalty functions are constructed so that the lower the rank of the tool group, the greater is the negative contribution to the objective function thus generating a preference for the higher ranked tool groups in the distribution of work. Such penalty functions may take any suitable form consistent with the above goal. For the linear programming case, they can be conveniently constructed using piecewise linear functions whose slopes increase with decreasing rank order of the tool group. Such an example of the use of piecewise linear functions is shown below.

Multiple Operations and Cascade Groups

The above formulation can be generalized for the more complicated case in which many operations are shared among a set of parallel unrelated tool groups. To handle the problem of multiple operations, we introduce the idea of cascade groups. Operations are organized into disjoint (non-overlapping) sets designated by a cascade group index g with the set 'OperbyGrp[g]' consisting of all those operations that can be performed on a specific combination of tool groups. The associated combination of tool groups is then defined as the set 'ToolsbyGrp[g]'. For convenience, we will sometimes refer to the sets 'OperbyGrp' as "operation cascade groups" and to a specific set 'OperbyGrp[g]' with group index 'g' as "operation cascade group g". Likewise, we will refer to the sets 'ToolsbyGrp' as "tool cascade groups" and to a specific set 'ToolsbyGrp[g]' with group index 'g' as "tool cascade group g". When referring to both types of sets, we will use the general terminology "cascade groups".

To graphically illustrate the concept of cascade groups, consider again FIG. 1B, wherein there is displayed the three tool group cascade set involving 12 operations. As previously described, some of the operations are shared among all three tool groups, some between two and some are restricted to one tool group alone. For convenience, the chart in Table 1A displays in a simplified format how the twelve operations are shared among the three tool groups. For example, operations 1 and 2 can be performed on all three tool groups; thus, they constitute elements of the set OperbyGrp[1] which has associated with it the set ToolsbyGrp[1] consisting of tool groups TG1, TG2 and TG3. For a cascade set consisting of three tool groups, there is, of course, just one such cascade group. Operations 3 and 4 are performed on tool groups TG1 and TG2 and thus constitute another cascade group (labeled 2). Two more such two-tool group cascade groups are possible, and in this example are shown labeled as tool groups TG3 and TG4. There are three more cascade groups involving just one tool group each, for a possible total of seven cascade groups. Table 1A shows how the operations are shared among three tool groups. The seven possible cascade groups and the corresponding sets OperbyGrp and ToolsbyGrp are listed in Table 1B.

TABLE 1A

| Oper | TG1 | TG2 | TG3 |
|------|-----|-----|-----|
| 1    | X   | X   | X   |
| 2    | X   | X   | X   |
| 3    | X   | X   |     |
| 4    | X   | X   |     |
| 5    | X   |     | X   |
| 6    | X   |     | X   |
| 7    |     | X   | X   |
| 8    |     | X   | X   |
| 9    | X   |     |     |
| 10   | X   |     |     |
| 11   |     | X   |     |
| 12   |     |     | X   |

TABLE 1B

| Cascade group set index g | Sets OperbyGrp[g] | Sets ToolsbyGrp[g] |
|---------------------------|-------------------|--------------------|
| 1 | 1,2   | 1,2,3 |
| 2 | 3,4   | 1,2   |
| 3 | 5,6   | 1,3   |
| 4 | 7,8   | 2,3   |
| 5 | 9,10  | 1     |
| 6 | 11    | 2     |
| 7 | 12    | 3     |

The number of such groups for an arbitrary cascade set consisting of three tool groups may be fewer than seven depending on what operations are actually shared. For a two member cascade set, the number of possible cascade groups is three, while for a four member set, it is fourteen.

Cascade groups, by organizing operations into sets, the members of which are uniquely identified with a specific set of tool groups, provide the generalization of the simpler situation for non-cascade tools in which a set of operations is uniquely identified with a single tool group required to treat the case of operations shared among unrelated, parallel tools.

Table 2 shows the explicit ratios for each of the twelve operations of the process time of that operation on the indicated tool groups to that on the primary tool group in the same tool cascade group, or to that of the highest ranking tool group in the tool cascade group if the group does not contain a primary.

TABLE 2

Process Time Ratios by Operation and Tool Group

| Group | Opr | TG1 | TG2 | TG3 |
|-------|-----|------|------|------|
| 1 | 1 | 1.00 | 1.80 | 2.00 |
| 1 | 2 | 1.00 | 1.50 | 2.25 |
| 2 | 3 | 1.00 | 0.50 |      |

TABLE 2-continued

Process Time Ratios by Operation and Tool Group

| Group | Opr | TG1 | TG2 | TG3 |
|-------|-----|------|------|------|
| 2 | 4  | 1.00 | 2.00 |      |
| 3 | 5  | 1.00 |      | 1.50 |
| 3 | 6  | 1.00 |      | 0.75 |
| 4 | 7  |      | 1.00 | 1.67 |
| 4 | 8  |      | 1.00 | 1.25 |
| 5 | 9  | 1.00 |      |      |
| 5 | 10 | 1.00 |      |      |
| 6 | 11 |      | 1.00 |      |
| 7 | 12 |      |      | 1.00 |

For the primary (or highest ranked T/P) that ratio is, of course, identically one. Each such ratio is characterized by a cascade group number, an operation number and a tool group number as shown in the table. Explicitly keeping track of these individual ratios in the formulation, as opposed to assuming they are constant or taking some sort of ratio average, is what enables the method according to the invention to deduce an exact answer for the allocation of work among the tool groups.

For the case of multiple operations, a defining equation is still written for each operation as in Equation (1), but we now introduce an additional index or subscript g which describes to what cascade group the operation and the associated tool groups belong. Thus, we have $$\sum_{p \in P} W_p U_{p,g,s} = \sum_t f_{g,s,t} \frac{N_t A_t}{R_{g,s,t}} \quad (t \in ToolsbyGrp[g]) \qquad (3)$$

for all operations s (OperbyGrp[g]) belonging to the operation cascade group g. The fractional allocations $f_{g,s,t}$ (decision variables) and the process time ratios $R_{g,s,t}$ are now associated with the cascade group g in which the operation s is contained, as well as with the operation s and the cascade tool group t. By writing a constraint equation involving the appropriate fractional allocation decision variables for each and every operation, we are able to exactly handle the problem of process time ratios that vary in an arbitrary way from operation to operation. No assumptions concerning the constancy of such ratios are made, nor are any sort of averages, weighted or otherwise, of the individual process ratios over a cascade group or cascade set of tools taken.

In a similar way to Equation (1) for a single operation, the right side of Equation (3) represents the total required time referenced to the primary or otherwise preferred tool group for all products being processed through operation s, while the right side represents how that time will be allocated to each of the tool groups belonging to the tool cascade group g capable of performing that operation, with an effective available time per day for each tool group introduced in order to take into account the fact that the processing time on the various tool groups relative to the primary tool group is the variable ratio $R_{g,s,t}$.

Equation (3) is merely a defining equation for $f_{g,s,t}$. The actual constraining factors in the problem are the individual capacities of the separate tool groups. To make that connection, we define the fractional use (FracUse[t] for short) of an individual tool group, F. FracUse[t] is obtained by first summing over the set of all operations (OperbyGrp [g]) contained in operation cascade group g and then by summing over all the tool cascade groups g which contain the tool group t.

$$F_t = \sum_{g:\, t\in ToolsbyGrp[g]} \sum_{s\in OperbyGrp[g]} f_{g,s,t} \qquad (4)$$

The expression g:t∈ToolsbyGrp[g] under the left hand summation explicitly confines the sum over cascade groups g to only those groups such that tool t is contained in the group. Equation (4) simply sums up all contributions to the utilization of the tool group from whatever operations are performed by the tool group contained in whatever cascade groups.

Penalty Functions

Usual practice would be to write a constraint equation requiring that $F_t \leq 1$ reflecting the consideration that a tool group cannot ordinary be used to more than 100% of its capacity. Frequently however, in realistic capacity planning, the planners, lacking adequate knowledge of the outcome, may set the minimums on the product parts per day ranges too high to prevent various tool groups from becoming overloaded. In such a case, an infeasible solution would be obtained, the output of which would not be reliable. No information on what the problem tool groups were would likely be available.

As part of this invention, we extend the penalty function concept introduced above to employ very large penalty functions in the objective function for values of FracUse $F_t$ greater than one, rather than absolutely prohibiting $F_t$ from exceeding one. In this way, a sensible feasible solution may still be obtained even though certain tool groups may have their capacities exceeded. Most importantly, such a solution can specifically reveal what the problem tool groups are and by specifically how much the designated product starts have forced them to exceed their nominal capacities. This represents key information to capacity planners. Numbers of tools or minimum parts per day values can then be adjusted to obtain a truly feasible solution.

The penalty functions for $F_t \geq 1$ increase with decreasing rank order of the tool group so that any overload is directed first to the primary which is the likely tool that would be purchased if it were deemed necessary to expand the capacity of the cascade set.

For $F_t \leq 1$, differing penalty functions dependent upon the FracUse $F_t$ associated with each type of tool group, primary, secondary, etc., cause the work coming to the cascade set to be distributed in the preferred rank order as in the simpler case of a single operation. Here, however, the penalty function is associated with the total fractional use of the tool group which is an aggregate of the individual fractional allocations associated with each operation the tool group is capable of performing. Again, in the case where the problem is treatable as a linear program, piecewise linear functions of successively greater slope can be utilized to direct work to the tool groups in the preferred rank order.

Figure 2:
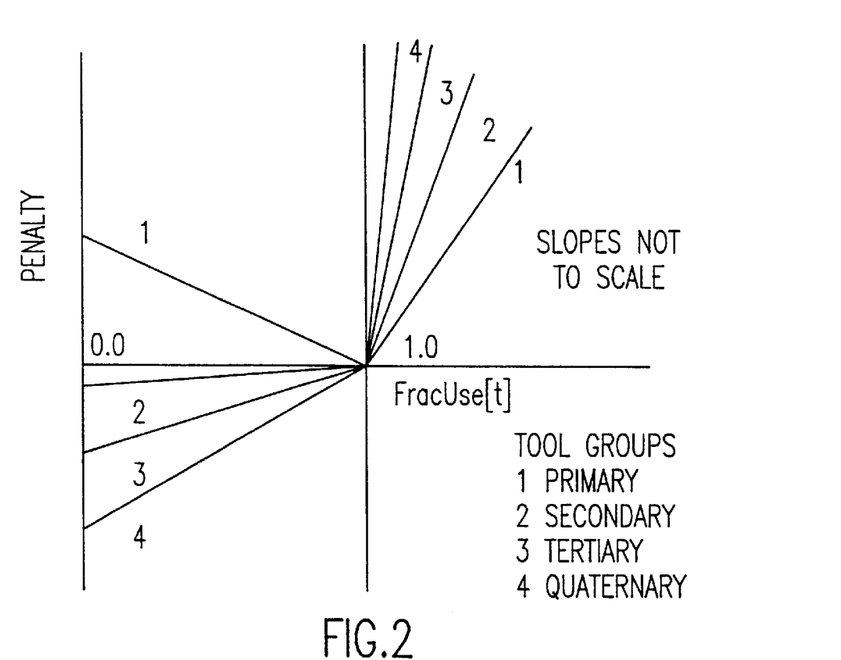
FIG. 2 is a graph showing penalty functions formulated as piecewise linear functions for a cascade tool set of four parallel, unrelated tool groups.

FIG. 2 shows one example of such a set of piecewise linear functions that accomplish the purpose of directing the work in such a preferred rank order to four tool groups in a cascade set. For $F_t \leq 1$, the negative slope for the primary with the function going to zero at $F_t = 1$, encourages the desired maximum use of the primary up to its nominal full capacity at a FracUse of one. The very steep slope beyond one, ($F_t \geq 1$ slopes are several thousand times steeper than shown in the drawing) prevent overuse of the primary tool group in favor of the secondary, which below $F_t = 1$, has the smallest slope of the non-primary tool groups. Work that cannot be accommodated on the secondary then flows to the tertiary, which has the next steepest slope and then to the quaternary with largest slope (below $F_t = 1$) of all. Placing the function for the primary tool group above the axis with negative slope and the functions for the non-primary tool groups below the axis with positive slopes (instead of above as for the primary) is necessary to prevent undesired use of non-primary tool group capacity by forcing slower operations to non-primary tool groups in order to bring their FracUse to as close to one as possible. Only when all the possible capacity below FracUse=1 has been utilized for all the tool groups, will a transition occur to the nominally forbidden region for $F_t \geq 1$. The successively steeper slopes in that region guarantee that the primary will be filled first and then the successively lower ranked tool groups in their appropriate order.

The ratio of the slopes of lower ranked tool groups to the higher ranked tool groups must be sufficiently great that faster processing rates occurring on lower ranked tool groups will not cause work to be shifted to the lower ranked tool when capacity is available on the higher ranked one. If the average process rate on lower ranked tool group TG B is K times that of a higher ranked tool group TG A, then B's slope should exceed that for A by at least a factor of K. The slopes in this discussion are the base slopes. Because we are dealing with the FracUse of tool groups (as opposed to individual tools) whose capacities are proportional to the number of tools in the tool group; such base slopes must be multiplied by the number of tools $N_t$ contained in each respective tool group to arrive at the actual slope value used in the objective function. This is necessary to prevent work from being unduly transferred to a lower ranked tool group merely because it contains a greater number of tools than one more highly ranked.

Use of Penalty Functions to Determine Tool Groups That Are Gating

One of the classic problems for capacity analysis of a manufacturing line is to determine what tool groups constitute gating or bottleneck tool groups, i.e., those tool groups, as the terms imply, that limit the production of the line. Such tool groups are particularly important because it is to these tool group's that tools need to be added to increase output. Gating non-cascade tool groups are simply those tool groups that are operating at 100% of capacity. For tool groups that can partially share work, namely those of a cascade set, the situation is much more complicated. For example, just because a primary tool group is at 100% does not mean it is gating. Additional work might be able to be easily accommodated on the secondary or tertiary tool group of the cascade set. In general, this is the most common scenario. The primary tool group fills up to 100% capacity, with the work that cannot be handled by the primary tool group then channeled to the tool groups of lower rank, which are not filled. For the product mix producing such a solution, purchasing an additional primary tool would produce no additional product. On the other hand, it might indeed be the case that at the product mix in question, the non-primary tool groups are handling the maximum they can accommodate, in which case the 100% loaded primary tool groups would be truly gating. The difficulty is that such a situation may occur when the FracUse values for the non-primary tool groups are significantly below 1.0. This can result from the fact that in general only some operations, not all, are shared between the primary and non-primary tool groups. The fill factor of a non-primary tool group may be principally determined by the processing required for those operations uniquely confined to it with little to do with the work capable of being transferred between primary and non-primary. (Only when all operations are shared is it guaranteed that a FracUse value smaller than one indicates a tool group that can accommodate further work.) A similar problem exists in trying to use FracUse values to determine whether a non-primary tool group is gating, as they may frequently be.

Given that FracUse values by themselves cannot be used to determine what are the gating tool groups within a cascade sets, this invention sets out a method to precisely identify which tool groups are gating through the use of penalty functions in the objective function. The method depends upon the idea of inserting an intermediate region along the FracUse axis, beginning at FracUse=1.0 and extending to a point 'x', an arbitrarily small distance beyond $F_r$=1.0. The start of the original region of very severe penalty functions is now displaced to $F_r$=x from $F_r$=1.0. The penalty functions may in general be non-linear functions, but we illustrate a particular case using the piecewise linear functions displayed in FIG. 3.

Figure 3:
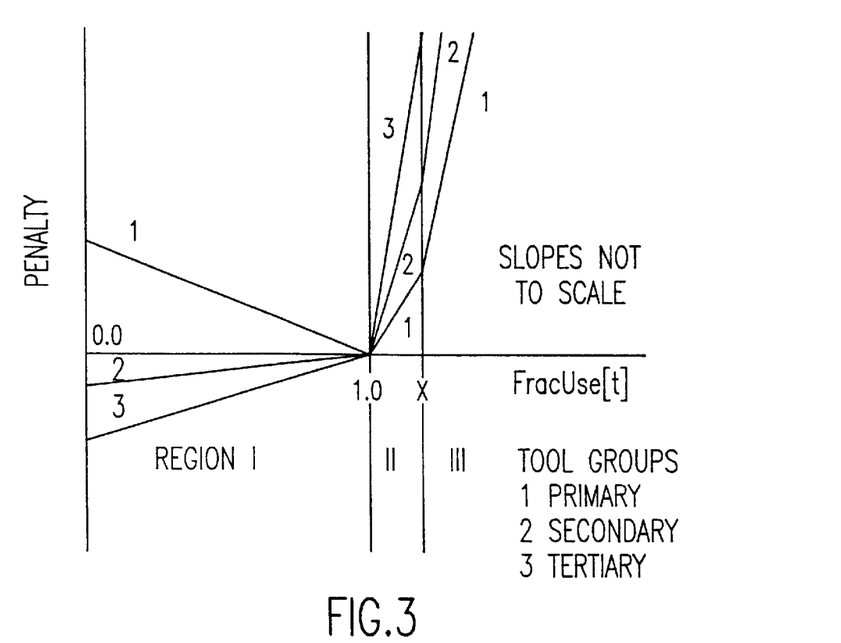
FIG. 3 is a graph showing piecewise linear functions constructed over three regions for the purpose of distinguishing what cascade sets of tool groups are truly gating.

In FIG. 3, regions I and III correspond to the two regions laid out previously in FIG. 2 for FracUse below one (permissible range) and FracUse above one (nominally forbidden range), respectively. The respective penalty slopes in those two regions do not undergo alteration. The newly introduced intermediate region II extends from FracUse=1 to FracUse=x, here shown with its width greatly exaggerated in size for clarity. Penalty slopes in region II are intermediate between those in regions I and III, but generally much closer in magnitude to those in region I. Consider the case of more work flowing to the primary tool group than it can handle. In the ordinary case that work will be displaced to the secondary tool group, once FracUse for the primary surpasses 1.0. This occurs because the penalty slope in region II (above 1.0) appreciably exceeds that for the secondary in region I below FracUse=1.0. The FracUse value for the primary remains precisely at 1.0. If however, because of mismatched operations between the primary and secondary, the secondary cannot accommodate this overflow regardless of the relative slopes, the point of operation on curve 1 will by necessity move up the small distance from 1.0 to x. A suitable value for x might be 1.001. Thus, consider two different optimal solutions involving a primary Tool group with a nominal FracUse of one and a secondary with FracUse less than one, the first with a precise primary FracUse of 1.000 and the second with a primary FracUse of 1.001. In the first case, the primary would not be gating, while in the second case it definitely would be gating and thus a candidate for having a tool added to increase production. As in region III, the slopes in intermediate region II are made successively greater as the tool group rank decreases to assure that Tool groups are filled in the desired order. Thus, for example, if a secondary tool group were to exhibit a FracUse value of 1.001 (having climbed the steeper slope for curve 2 as compared to curve 1 for the primary), while the primary's FracUse remained at 1.000, one would conclude that the secondary had to be the gating tool group in this case.

Table 3 illustrates several cases of the cases discussed above.

TABLE 3 x = 1.001

|   | TG | NumAvl | NumReq | FracUse |   |
|---|----|--------|--------|---------|---|
| A) | 1 | 5 | 5.000 | 1.000 | Not Gating |
|   | 2 | 4 | 3.208 | 0.802 |   |
|   | 3 | 2 | 1.660 | 0.830 |   |
| B) | 1 | 5 | 5.005 | 1.001 | Gating |
|   | 2 | 3 | 2.806 | 0.935 |   |
|   | 3 | 1 | 0.950 | 0.950 |   |
| C) | 1 | 4 | 3.604 | 0.901 |   |
|   | 2 | 3 | 3.003 | 1.001 | Gating |
|   | 3 | 1 | 0.960 | 0.960 |   |

TABLE 3-continued x = 1.001

|   | TG | NumAvl | NumReq | FracUse |   |
|---|----|--------|--------|---------|---|
| D) | 1 | 4 | 4.004 | 1.001 | Gating |
|   | 2 | 2 | 2.002 | 1.001 | Not Gating |
|   | 3 | 2 | 1.904 | 0.952 |   |

Example A demonstrates the case where additional be accommodated on the secondary and tertiary tool groups. The primary tool group, nominally at 100% of capacity, is sitting at the beginning of region II with FracUse=1.000. In example B, the primary tool group has been forced to move up to the upper end of region II (FracUse=1.001) because the lower ranked tool groups can not take further work. The primary tool group is gating. Example C illustrates the case last described in the paragraph above; i.e., the primary tool group not gating, but the secondary tool group is gating. Case D is described below.

For the case of a non-primary tool group, it is not sufficient that it merely exhibit a FracUse value of 1.001 to qualify as a gating tool group and thus one which should have its number increased. The primary may also have a FracUse of 1.001 indicating the entire cascade set is gating. Additional work could be accommodated on either tool group. In such a case, one would ordinarily want to increment the primary tool group. (The secondary might be an older tool no longer even available.) In effect, secondary, tertiary, etc. Tool groups are only considered gating if the primary tool group in the same cascade set is not gating; i.e., its FracUse<1.001. Thus, results among cascade sets should be scanned to eliminate from any list of potential gating cascade tool groups (those with FracUse=1.001) any non-primary tool groups in which the primary in the same set exhibits a value of 1.001. See case D in Table 3.

Of great use in capacity planning would be a utility that after having arrived at a feasible solution for an optimal mix of products for a given tool set, would automatically locate the truly gating tool groups, and automatically increment such tools to produce an iterated solution for a new mix of increased volume. A sequence of such iterations would provide an ordered progression representing the most efficient way of increasing production capacity with the minimum expenditure for new tools. The capability described above of being able to unambiguously identify gating Tool groups among parallel, unrelated tool groups enables such a utility to be realized.

Implementation

Figure 4:
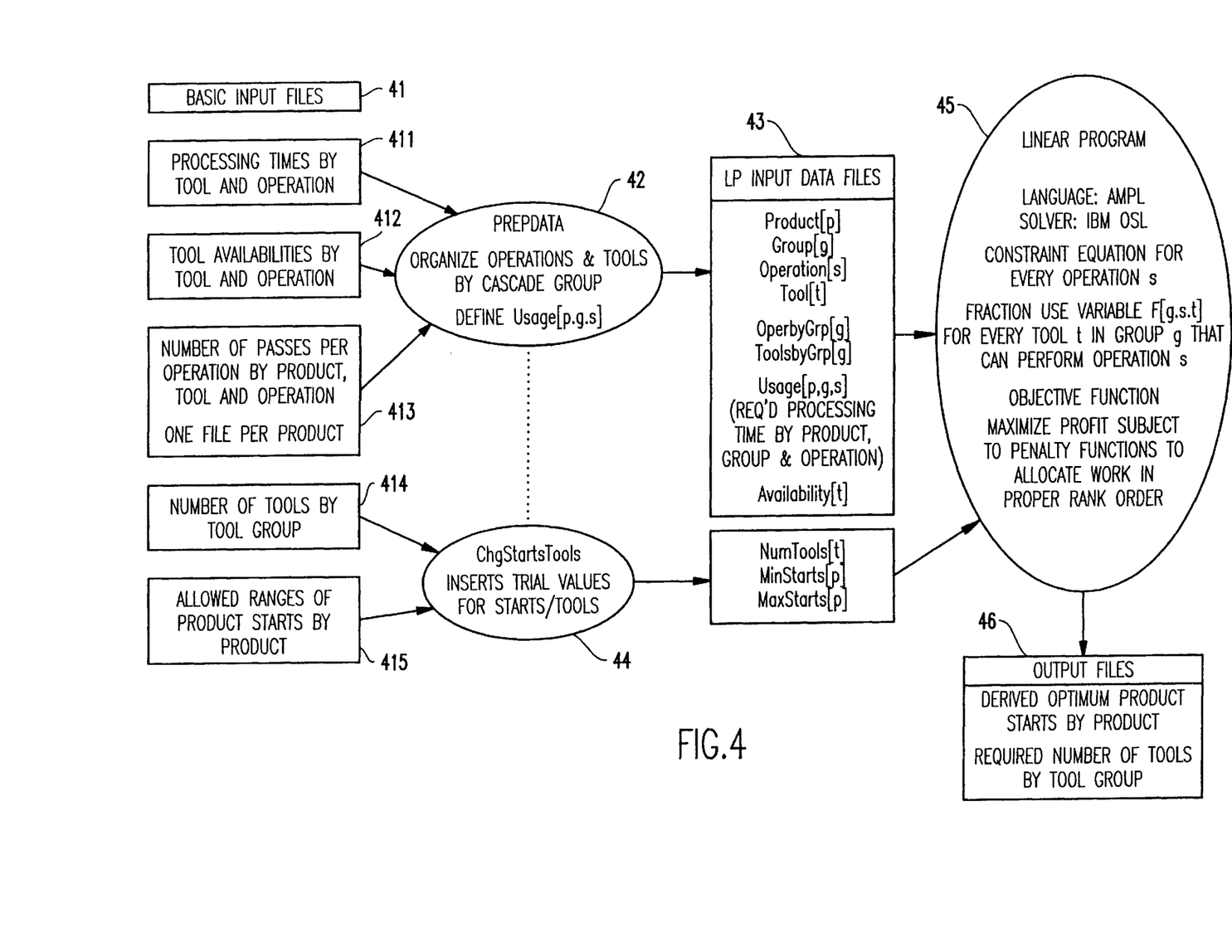
FIG. 4 is a flow diagram illustrating the logical implementation of the invention on a computational engine.

An implementation will now be described with reference to FIGS. 4 and 5A, 5B and 5C. FIG. 4 is a flow diagram illustrating the logical implementation of the invention on a computational engine. As shown in FIG. 4, the implementation consists of an interface to a computation engine that aggregates very raw data, labeled "Basic Input Files" 41, detailing by time period, the processing times 411, tool availabilities and load factors 412, and the number of passes 413 per product for every operation on every tool group in the manufacturing line into the required inputs for the method invented. The computation engine 42, labeled PREPDATA in FIG. 4, scans the list of operations, locating identical operation names within cascade sets of tool groups and organizes tool groups and the operations into the appropriate cascade groups, "OperbyGrp" and "ToolsbyGrp", respectively, as Linear Programming (LP) input data files 43, as previously described. The processing times and number of passes (the number of times a product visits a particular operation) for each operation and product are combined into a derived quantity called the "Usage(p,g,s)", denoted by $U_{p,g,s}$ in equation 3, which represents the required time to process product p through all passes of operation s, on the primary or otherwise preferred tool group contained in cascade group g. The primary, secondary, etc. tool groups in each cascade set are explicitly kept track of in order to enable the correct penalty function to be associated with the appropriate tool group.

Figure 5A:
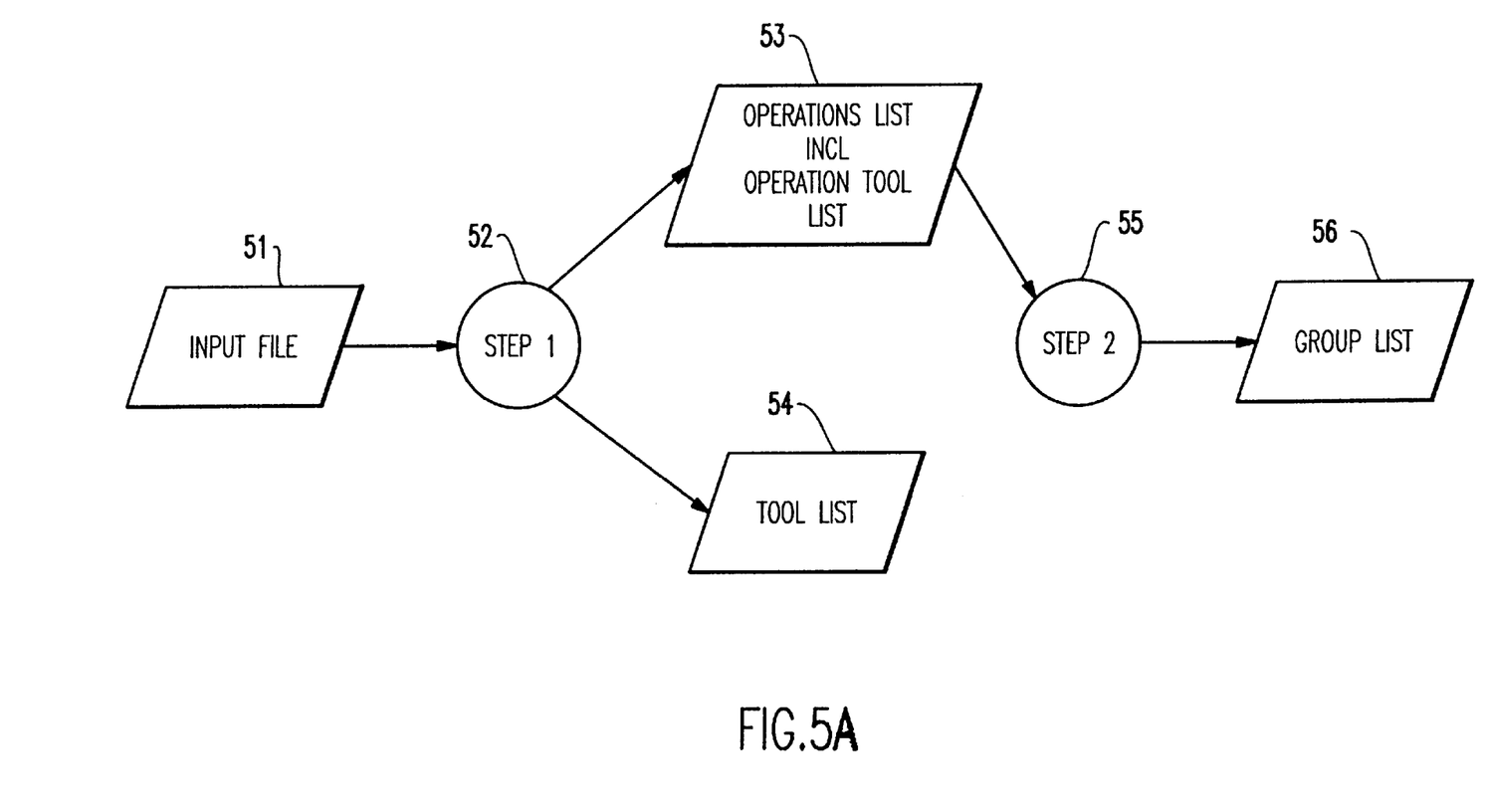
FIGS. 5A, 5B and 5C are detailed flow diagrams illustrating the action of the specific computational engine in FIG. 4.
Figure 5B:
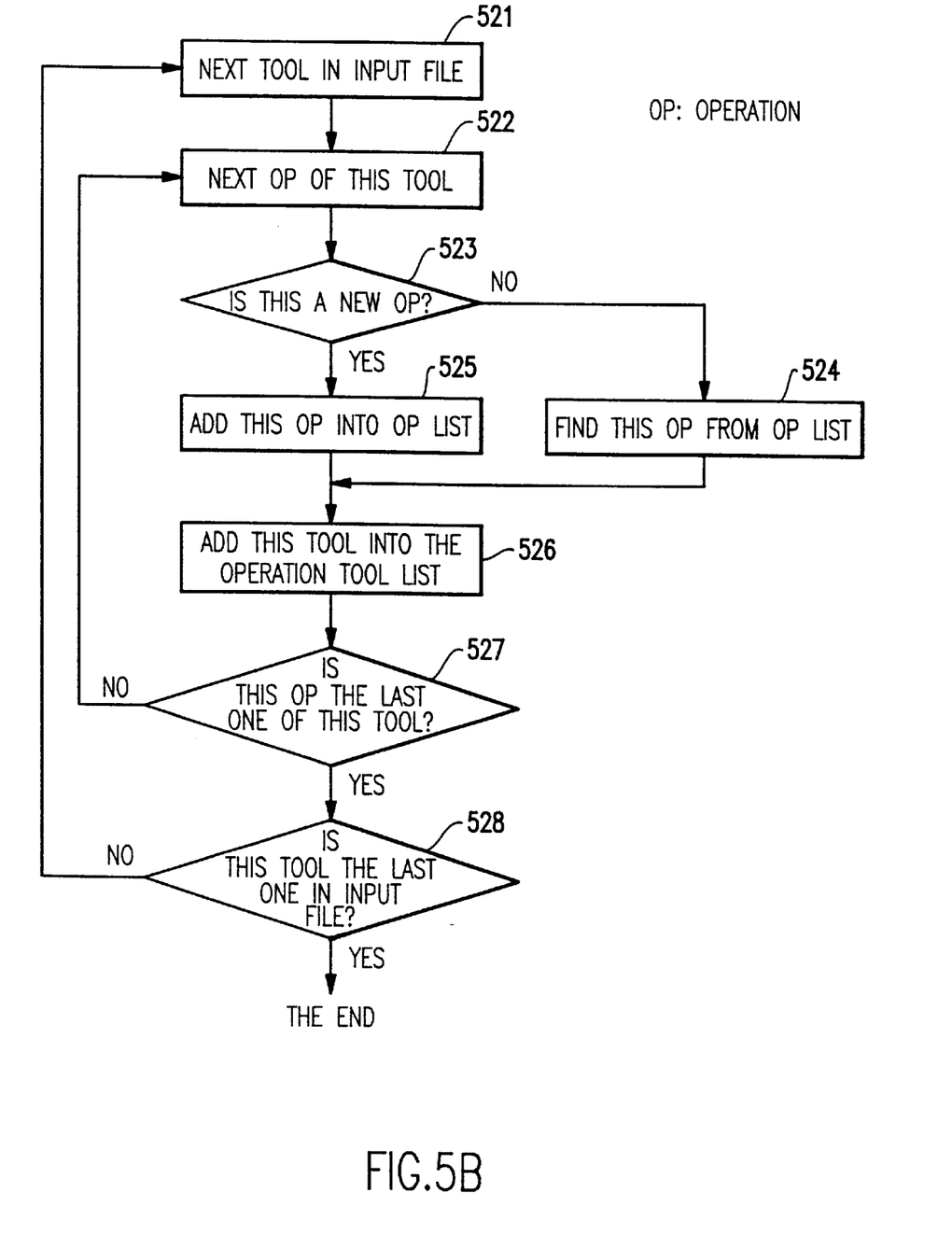
Figure 5C:
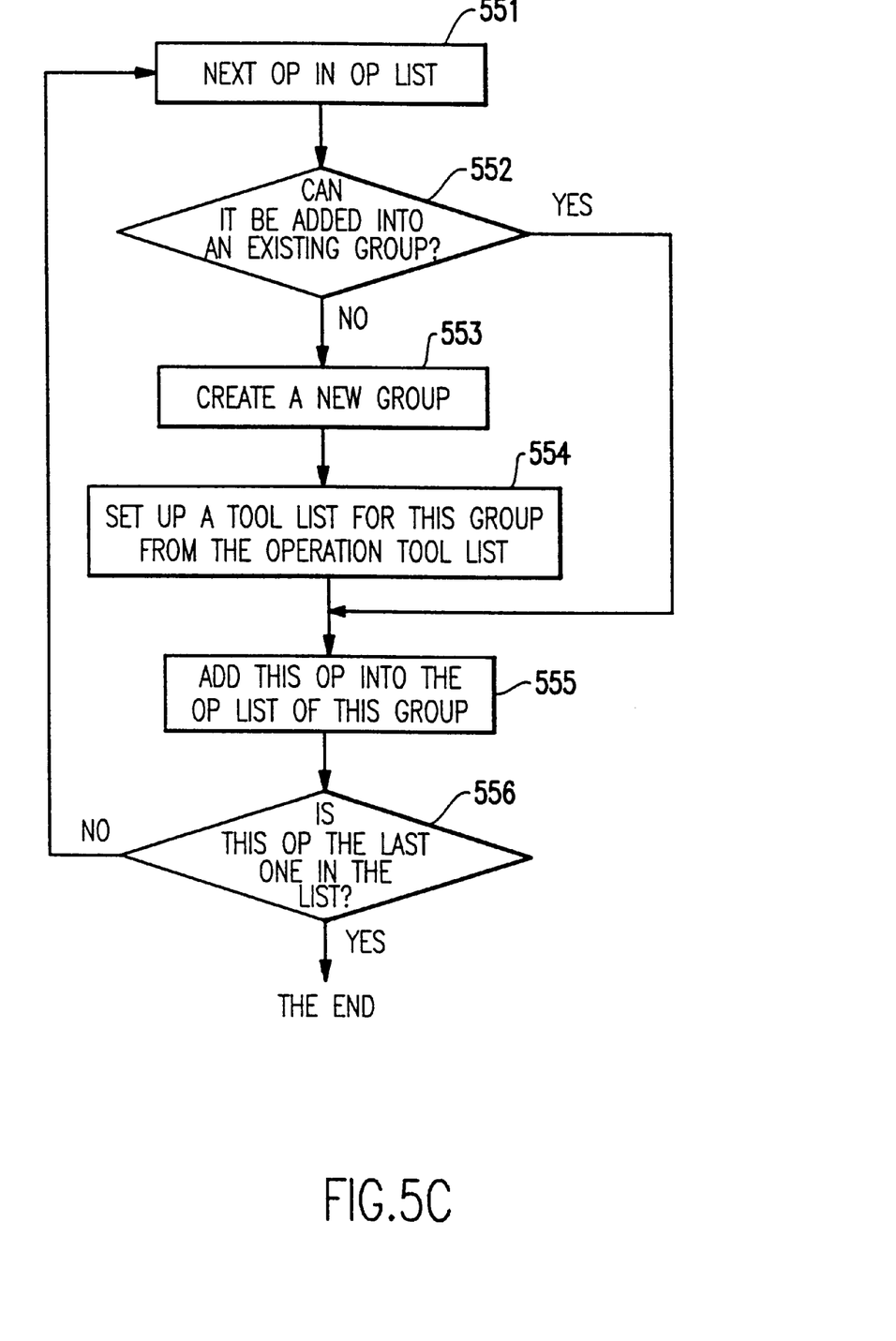

FIGS. 5A, 5B and 5C show in more detail how the computation engine 42, labeled PREPDATA, goes about organizing operations and tool groups into the aforementioned cascade groups, OperbyGrp and ToolsbyGrp. The input file 51 contains a list of all tool groups and, for each one, a list of operations that it can perform. In step 1 at operation 52, a series of software procedures, shown in more detail in FIG. 5B, reads the Input File 51 and creates both the Operations List 53 and the Tool List 54. The Operations List 53 is a list of all operations, each unique operation appearing exactly once in the list. Each operation in the Operations List 53 has a list of tools associated with it which is the list of tools that can perform this operation. This list of tools is referred to as the Operation Tool List. The Tool List 54 is a list of all tools.

Step 1, operation 52, is shown in more detail in FIG. 5B. Each tool in the input file is read in function block 521, and for each tool, the next operation of the tool is determined in function block 522. A test is made in decision block 523 to determine if this is a new operation for the tool and, if not, the operation is found from the operation list in function block 524; otherwise, the operation is added to the operation list in function block 525. Then, the tool is added into the Operation Tool List in function block 526. A test is then made in decision block to determine if this operation is the last operation for this tool and, if not, the process loops back to function block 522; otherwise, a test is made in decision block 527 to determine if this tool is the last one in the input file. If the last tool in the input file, the process of step 1 ends; otherwise, the process loops back to function block 521 to read the next tool in the input file.

Step 2 at operation 55 is a series of software procedures, shown in more detail in FIG. 5C, which reads the Operations List 53 and creates the Group List 56. The Group List 56 is a list of groups, where a group is defined as a list of operations, all of which can be performed by the same set of tools, and a list of the tools which can perform these operations. In other words, a group is a list, each element of which consists of two lists; a list of operations, referred to as OperbyGrp, and a list of tools that can perform all of these operations, referred to as ToolsbyGrp. Each operation in the Operations List 53 can appear in only one group, but each tool in the Tool List 54 can appear in one or more groups.

Step 2, operation 55, is shown in more detail in FIG. 5C. Each operation in the Operations List 53 is read in function block 551, and a determination is made in decision block 552 as to whether the operation can be added into an existing group. If not, a new group is created in function block 553, and a tool list for the group is set up from the Operation Tool List in function block 554. At this point, the operation read from the Operation List is added into the operation list of the group in function block 555. A test is then made in decision block 556 to determine if this operation is the last operation in the list and, if not, the process loops back to function block 551 to read the next operation in the Operation List. When all operations in the Operation List have been processed, the process ends.

In the process implemented by the computation engine 42, C code data structures are used for the Operations List 53, including the Operation Tool List, the Tool List 54 and the Group List 56.

Referring back to FIG. 4, the end user may also interact with the input data through a Menu Program or through a Graphical User Interface (GUI) and modify the data (for example, changing the allowed ranges for product starts 415, the profits associated with each product and/or the numbers of tools per tool group 414) for "what-if" analyses. Such trial variations are accomplished by the computational engine 44 labeled "ChgStartsTools" in FIG. 4.

Program codes are written in C and c-shell-script languages running under the UNIX operating system environment, such as IBM's AIX operating system. Implementation is on an IBM RISC6000 workstation. Users, however, may interact with the application in client-server mode with the GUI operating on a standard IBM compatible personal computer running IBM's OS/2 operating system.

The described method for allocating work in rank order across parallel unrelated tools for capacity planning is formulated as a non-integer, linear program 45, labeled LINEAR PROGRAM in FIG. 4, with piecewise-linear penalty terms incorporated into the objective function which serve to discourage, but not prevent, using a tool group to greater than 100% of its available time and to distribute work in the preferred sequence among such parallel, unrelated tool groups. In this way, the implementation is able to provide output data on both the number of tools needed for a particular product mix and volumes and on the optimal product mix and volumes for a fixed tool set. Output data is contained in formatted output reports 46, labeled "Output Files" in FIG. 4, by individual time period and in multi-period summary reports which detail required versus available numbers of tools and/or the derived optimum number of starts per day by product.

The results of the various "what-if" scenarios are organized into sets of files whose filenames end in a characteristic suffix, a trial name, initially selectable by the user and which he can use to retrieve such files by selection through the GUI or Menu. If desired, detailed output reports can be printed breaking down tool group usage by operation by operation, such information frequently being of vital interest to engineers with responsibility for particular cascade sets.

The implementation also includes a module, that using the capability described in the invention of being able to identify truly gating tool groups among parallel, unrelated tool groups, selects those tool groups for incrementing, producing a new optimal solution for product mix and volume that represents the most efficient way of increasing manufacturing line output for the least number of additional tools. Any number of automatic iterations of the tool set can be set by the user.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method providing accurate capacity planning for manufacturing environments comprising parallel, unrelated tools that can process the same operations at different rates and with preferences for the sequence in which those tools are selected to accommodate a workload, said method comprising the steps of:

inputting data detailing by time period processing times, tool availabilities and load factors, and a number of passes per product for every operation on every tool group in a manufacturing line;

scanning a list of operations, locating identical operation names within cascade sets of tool groups and organizing tool groups and the operations into the appropriate cascade groups as Linear Programming (LP) input data files;

calculating from the LP input data files an allocation of workload to parallel, unrelated tool groups in a cascade set, with a preference for an order in which the tool groups are to be used and in which ratios of process times of operations performed on different tool groups varies by operation; and generating output files which report the derived optimum product starts by product and required number of tools by tool group.

2. A computer implemented method providing accurate capacity planning for manufacturing environments comprising parallel, unrelated tools that can process the same operations at different rates and with preferences for the sequence in which those tools are selected to accommodate a workload, said method comprising the steps of:

inputting data detailing by time period, processing times, tool availabilities and load factors, and a number of passes per product for every operation on every tool group in a manufacturing line;

scanning a list of operations, locating identical operation names within cascade sets of tool groups and organizing the operations and tool groups into the appropriate cascade groups, OperbyGrp and ToolsbyGrp, respectively, as Linear Programming (LP) input data files, the step of organizing tool groups and the operations into the appropriate cascade groups as Linear Programming (LP) input data files including the step of combining processing times and number of times a product visits a particular operation into a derived quantity $U_{p,g,s}$, called Usage, which represents a required time to process a product p through all passes of an operation s, on a primary or otherwise preferred tool group contained in tool cascade group g;

calculating from the LP input data files an allocation of workload to parallel, unrelated tool groups in a cascade set, with a preference for an order in which the tool groups are to be used and in which ratios of process times of operations performed on different tool groups varies by operation;

generating output files which report the derived optimum product starts by product and required number of tools by tool group.

3. A computer implemented method providing accurate capacity planning for manufacturing environments comprising parallel, unrelated tools that can process the same operations at different rates and with preferences for the sequence in which those tools are selected to accommodate a workload, said method comprising the steps of:

inputting data detailing by time period, processing times, tool availabilities and load factors, and a number of passes per product for every operation on every tool group in a manufacturing line;

scanning a list of operations, locating identical operation names within cascade sets of tool groups and organizing tool groups and the operations into the appropriate cascade groups as Linear Programming (LP) input data files, the step of organizing tool groups and the operations into the appropriate cascade groups as Linear Programming (LP) input data files including the step of combining processing times and number of times a product visits a particular operation into a derived quantity $U_{p,g,s}$, called Usage, which represents a required time to process a product p through all passes of an operation s, on a primary or otherwise preferred tool group contained in tool cascade group g;

calculating from the LP input data files an allocation of workload to parallel, unrelated tool groups in a cascade set, with a preference for an order in which the tool groups are to be used and in which ratios of process times of operations performed on different tool groups varies by operation;

generating output files which report the derived optimum product starts by product and required number of tools by tool group;

multiplying the Usage, $U_{p,g,s}$, for each operation s by a number of product starts, $W_p$, for product p;

summing over all products, P, to obtain a total required time for that operation according to the expression $$\sum_{p \in P} W_p U_{p,g,s}$$

thus obtaining a total required time referenced to the primary or otherwise preferred tool group contained in the tool cascade group g for all products being processed through operation s;

then allocating the total required time over the tool groups contained in tool cascade group g capable of performing that operation, according to the expression, $$\sum f_{g,s,t} \frac{N_t A_t}{R_{g,s,t}},$$

each tool group having its own fractional allocation, $f_{g,s,t}$; and taking into account variable process time ratios, $R_{g,s,t}$, on such tool groups to a process time of the primary tool group by introducing an effective available time per day, $$\frac{A_t}{R_{g,s,t}},$$

obtained by dividing actual available time per day, $A_t$, by a respective variable process time ratio, $R_{g,s,t}$, and further multiplying by a number of tools in the tool group, $N_t$, to obtain an effective available time per day for an entire tool group.

4. A computer implemented method providing accurate capacity planning for manufacturing environments comprising parallel, unrelated tools that can process the same operations at different rates and with preferences for the sequence in which those tools are selected to accommodate a workload, said method comprising the steps of:

inputting data detail by time period, processing times, tool availabilities and load factors, and a number of passes per product for every operation on every tool group in a manufacturing line;

scanning a list of operations locating identical operation names within cascade sets of tool groups and organizing the operations and tool groups into the appropriate cascade groups OperbyGrp and ToolsbyGrp, respectively, as Linear Programming (LP) input data files, the step of organizing tool groups and the operations into the appropriate cascade groups as Linear Programming (LP) input data files including the step of combining processing times and number of times a product visits a particular operation into a derived quantity $U_{p,g,s}$, called Usage, which represents a required time to process a product p through all passes of an operation s, on a primary or otherwise preferred tool group contained in tool cascade group g;

calculating from the LP input data files an allocation of workload to parallel, unrelated tool groups in a cascade set, with a preference for an order in which the tool groups are to be used and in which ratios of process times of operations performed on different tool groups varies by operation;

generating output files which report the derived optimum product starts by product and required number of tools by tool group;

multiplying the Usage, $U_{p,g,s}$, for each operation s by a number of product starts, $W_p$, for product p;

summing over all products, P, to obtain a total required time for that operation according to the expression $$\sum_{p \in P} W_p U_{p,g,s}$$

thus obtaining a total required time referenced to the primary or otherwise preferred tool group in tool cascade group t for all products being processed through operation s;

then allocating the total required time over the tool groups contained in tool cascade group g capable of performing that operation, according to the expression $$\sum f_{g,s,t} \frac{N_t A_t}{R_{g,s,t}},$$

each tool group having its own fractional allocation, $f_{g,s,t}$, where $f_{g,s,t}$ is the tool allocation variable that represents the fraction of the total capacity of tool group t that is devoted to performing operation s;

taking into account variable process time ratios, $R_{g,s,t}$, on such tool groups to a process time of the primary tool group by introducing an effective available time per day, $$\frac{A_t}{R_{g,s,t}},$$

obtained by dividing actual available time per day, $A_t$, by a respective variable process time ratio, $R_{g,s,t}$, and further multiplying by a number of tools in the tool group, $N_t$, to obtain an effective available time per day for an entire tool group;

summing the fractional allocations $f_{g,s,t}$ for each tool group over all operations contained within the set OperbyGrp, that contains all operations associated with the cascade group g, and then summing over all those tool cascade groups, ToolsbyGrp, to which that tool group belongs according to the expression $$F_t = \sum_{g:\, t \in ToolsbyGrp[g]} \sum_{s \in OperbyGrp[g]} f_{g,s,t}$$

in order to obtain a total fractional use $F_t$ of that tool group that is a decision variable used in a linear program (LP) objective function that constrains utilization of that tool group.

5. The computer implemented method of claim 4 further comprising the step of tracking primary, secondary, and any other tool groups in each cascade set in order to assign a penalty function in an LP objective function to allocate work in a proper rank order of the tool groups.

6. The computer implemented method of claim 5 further comprising the step of identifying gating tool groups among those tool groups in a cascade set operating at 100% capacity using a narrow intermediate penalty function region in the LP objective function beginning at a tool group fractional use of one.

7. The computer implemented method of claim 6 further comprising receiving inputs from a user changing a number of tools by tool group and allowed ranges of product starts by product in order to generate trial outputs to "what-if" scenarios.

8. A method of allocating work in capacity planning for manufacturing environments comprising parallel, unrelated tools that can process the same operations at different rates and with preferences for the sequence in which those tools are selected to accommodate a workload, said method comprising the steps of:

aggregating data of all the sequential operations of the parallel, unrelated tools and the processes needed to produce a product by time period into a much smaller set of distinct operations by identifying sequential operations that are actually the same operation performed on different products and also identifying the same sequential operations performed multiple times on a single product, sequential operations being all the separate operations performed in sequence on each separate product processed on a manufacturing line and the number of multiple times the same sequential operations are performed on a single product being referred to as the number of passes for that distinct operation on that product;

scanning the aggregated data for the distinct operations, locating identical distinct operations within individual cascade sets of tool groups, and organizing operations and tool groups into related sets of cascade groups determined by what are the specific sets of tool groups that can perform the operations; and formulating a non-integer, linear program with piecewise-linear penalty terms incorporated into an objective function which distributes work in a preferred sequence among such parallel, unrelated tool groups and which linear program, by the use of a summation in the objective function of product starts multiplied by profit or revenue per product start, also can optimize product mix for a fixed tool set when product starts are allowed to vary by product type over finite ranges.

9. The computer implemented method of claim 8 wherein the step of formulating a non-integer, linear program is performed by the step of, for each distinct operation, taking into account the number of passes for that operation on each product, to a sum of effective times on the tool groups capable of doing the operation, each such time being multiplied by a tool allocation variable that indicates the fraction of the tool group's capacity that is being allocated to performing the work associated with the operation.

* * * * *